United States Patent [19]
Ojima et al.

[11] Patent Number: 5,170,867
[45] Date of Patent: Dec. 15, 1992

[54] PEDAL PARKING BRAKE

[75] Inventors: Juji Ojima, Aikawa; Yoshiharu Kitamura; Kouichi Yamamuro, both of Komagane, all of Japan

[73] Assignee: NHK Spring Co., Ltd., Yokohama, Japan

[21] Appl. No.: 734,451

[22] Filed: Jul. 23, 1991

[51] Int. Cl.[5] ............................................. F16D 57/02
[52] U.S. Cl. .................................... 188/291; 74/512; 74/531; 188/77 W; 188/271; 192/12 BA; 192/57
[58] Field of Search ................... 188/77 W, 271, 291; 74/512, 531; 192/12 BA, 57

[56] References Cited

U.S. PATENT DOCUMENTS

| | | | |
|---|---|---|---|
| 2,751,773 | 6/1956 | Woodson | 192/12 BA |
| 3,051,445 | 8/1962 | Moulton | 192/12 BA X |
| 4,574,423 | 3/1986 | Ito et al. | 188/271 X |
| 4,796,733 | 1/1989 | Nakayama | 188/291 |

FOREIGN PATENT DOCUMENTS

| | | | |
|---|---|---|---|
| 106161 | 5/1988 | Japan | 74/512 |
| 306957 | 12/1988 | Japan | 74/512 |

Primary Examiner—George E. A. Halvosa
Attorney, Agent, or Firm—Keck, Mahin & Cate

[57] ABSTRACT

Pedal parking brake. This device is provided with a supporting shaft fixed to the side of a car body, a rotary body attached to another end of the supporting shaft, a damper case interposed between the supporting shaft and the rotary body, a lock spring latched to a lock releasing member, a clutch spring ineternally provided to the rotary body and the damper case being bridged thereon, and a viscous material filled in a clearance between the supporting shaft and the damper case.

3 Claims, 2 Drawing Sheets

PEDAL PARKING BRAKE

BACKGROUND OF THE INVENTION

This invention relates to a pedal parking brake of car wheel of a car or the like which operates the parking brake or releases it.

In recent car, a pedal parking brake has been adopted in place of a side brake which operates the parking brake by hand. FIG. 3 shows a conventional pedal parking brake published in an Official Gazette, Patent laid-open No. 63(1988)-106161.

Referring to the organization, a supporting shaft 3 is inserted into a frame 20 of a car body to fix it and a brake arm 4 is supported rotatively to the supporting shaft. A diameter of the supporting shaft 3 is formed so as to be slender stepwise toward a distant direction (right direction in FIG. 3) from the car body frame 20. At a large diameter portion of the car body frame 20, a brake arm cylinder 21 which rotates integrally with the brake arm 4 is inserted outwardly. A coil portion of a lock spring 22 is outwardly provided in a closely contact state so as to be bridged to the brake arm cylinder 21 and the supporting shaft 3. The lock spring 22 consists of a coil spring having a rectangular section, a hook portion 22a of the one end thereof being inserted into the supporting shaft 3, while a hook portion 22b of another end being inserted into a lock releasing ring 23 which is inserted outwardly into the supporting shaft 3 rotatively. When the lock spring 22 rotates the lock releasing ring 23 in a lock releasing direction, the coil portion thereof is adapted to enlarge the diameter.

A rotary drum 15 is outwardly provided at a small diameter portion of the opposite side of the car body frame 20 in the supporting shaft 3, from said rotary drum 15 a brake connecting plate 29 being extended in a brake arm direction 4 whereby the brake connecting plate 29 is connected with the brake arm with a connecting pin 24. Accordingly, when a treading operation of the brake arm 4 is performed, the rotary drum 15 rotates integrally with the brake arm 4 in the same direction thereof.

A fixed drum 14 opposed to the rotary drum 15 is provided at the outside of the rotary drum 15. A connecting plate 25 is fitted with one end surface of the fixed drum 14, and further is connected with the fixed drum cylinder 26 outwardly inserted into the supporting shaft 3 thereby being attached with the supporting shaft 3 indirectly.

Fins 18 and 17 having the teeth form of a comb which extend in the diameter direction of the supporting shaft 3 are attached to the fixed drum 14 and the rotary drum 15 respectively. These fins 18 and 17 are inserted into the fixed drum 14 and the rotary drum 15 respectively and alternately so as to have a fixed clearance, said clearance being filled therein with a viscous material such as a viscous grease or the like. Further, a clutch spring 27 consists of a coil spring having a rectangular section is outwardly provided in a closely contact state to the fixed drum cylinder 26 and the supporting shaft 3 so as to be bridged. The clutch spring 27 is wound in the same direction as the lock spring 22 and outwardly provided to the fixed drum cylinder 26 and the supporting shaft 3 in a closely contact state. The hook portions of these both ends from free ends. Further, the numeral 28 is a holding plate inserted into the top end portion of the supporting shaft 3 so as to prevent slipping out of the fixed drum cylinder 26 and the connecting plate 26 from the top end of the supporting shaft 3. Further, a return spring 5 is provided being bridged between car body frame 20 and brake arm 4.

However, the conventional pedal parking brake described above is complicated in construction. Further, since the lock and the clutch springs are arranged in parallel with respect to the supporting shaft, this device becomes long in the axial direction and to be a large size as a whole.

This invention is performed from such point of view and has its object to provide a pedal parking brake having a compact size.

SUMMARY OF THE INVENTION

In order to carry out the above object, the pedal parking brake according to this invention comprises a supporting shaft fixed to the side of a car body and provided with a cylindrical body integrally at one end side; a rotary body attached rotatively to a position opposed to said cylindrical body at another end side of the supporting shaft and connected with a brake arm; a damper case interposed between said supporting shaft and said rotary body; a lock spring which is outwardly provided in a closely contact state to said supporting shaft and said rotary body, one end of said lock spring being latched with said supporting shaft, while another end being latched with a lock releasing member; a clutch spring which is innerly provided in a closely contact state to said rotary body and said damper case; and a viscous material which fills a clearance between said supporting shaft and said damper case.

When the locking is released after treading the brake arm, the rotary body and the damper case rotate integrally whereby shearing stress acts on the viscous material filled in the clearance between damper case and supporting shaft. Accordingly, since the rotary force of the brake arm is absorbed to the viscosity resistance of the viscous material to same extent, the brake arm returns to an original position with slow speed.

Further, since both of the clutch and the lock springs are attaached doubly to the outer and inner sides of the supporting shaft respectively without being arranged in parallel to the supporting shaft, the device can be formed compactly.

DETAILED DESCRIPTION OF PREFERRED EMBODIMENTS

The preferred embodiments of this invention will be hereinafter described with reference to the accompanying drawings. The same construction elements as the conventional prior art are shown with the same numerals respectively.

Embodiment 1

Figure 1:
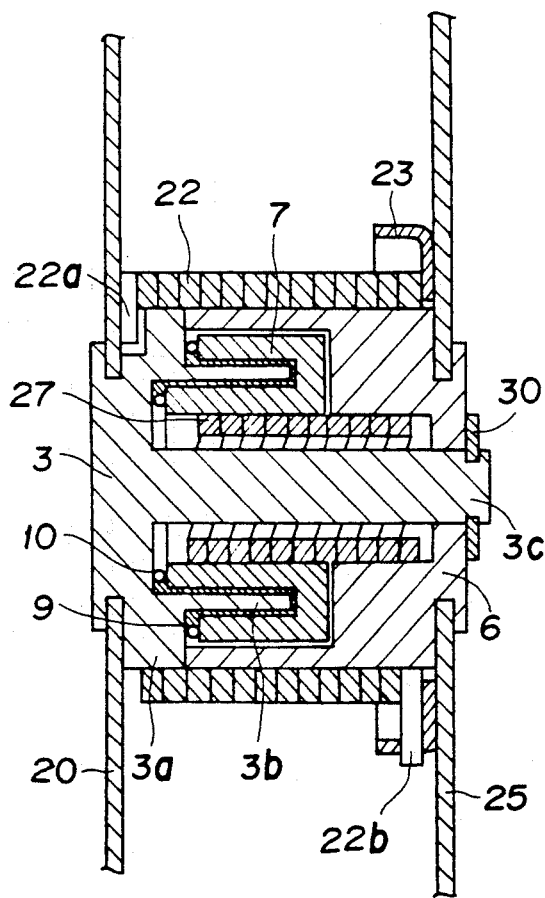
FIG. 1 is a cross-sectional view of an embodiment according to this invention.

In FIG. 1, the supporting shaft 3 is composed of a large diameter portion 3a at one end, a cylindrical portion 3b, and a small diameter portion 3c which extends from one end to another one, one end of the supporting shaft 3 being fixed with the car body frame 20. At another end of the supporting shaft 3, a rotary body 6 having an approximately cylindrical form connectd with a brake arm (not shown) is attached at a position opposed to the cylindrical portion 3b of the supporting shaft 3. A damper case 7 having a double cylindrical form is interposed between the rotary body 6 and the cylindrical portion 3b of the supporting shaft 3 so as to enclose the cylindrical portion 3b.

Further, the lock spring 22 is outwardly provided in a closely contact state to the large diameter portion 3a of the supporting shaft 3 and the rotary body 6. The lock spring 22 consists of a coil spring having a rectangular sectional area, a hook portion 22a of one end thereof being latched with the supporting shaft 3, while a hook portion 22b of another end thereof being latched with a lock releasing ring 23 as lock releasing material. Furthermore, a clutch spring 27 is innerly provided in a closely contact state to the rotary body 6 and the damper case 7, the clutch spring 27 consisting of a coil spring having a rectangular sectional area and the both ends thereof forming free ends. A clearance between cylinder portion 3b of the supporting shaft 3 and damper case 7 is filled with a viscous material such as viscous grease or the like. The numerals 9 and 10 in FIG. 1 present an O-ring interposed between the supporting shaft 3 and the damper case 7 respectively and seals the viscous grease closely therein. The numeral 25 shows a connecting plate which connects the rotary body to the brake arm and the numeral 30 show an E-ring inserted into the top end portion of the supporting shaft 3 so that the rotary body 6 may not get off from the supporting shaft 3. Further, a return spring, though not shown in FIG., is provided being bridged to the car body frame 20 and the brake arm as same as in the conventional device.

In such a constitution, when the brake arm rotates by being treaded, the rotary body 6 connected with the brake arm via the connecting plate 25 rotates. In this case, since the diameter of the lock spring enlarges and that of the damper case 7 shrinks, the damper case 7 is integrated with the supporting shaft 3 via viscous material and does not rotate. Accordingly, since the shearing stress of the viscous material does not operate in this case, the treading of the brake arm can be performed with a light force.

When the treading force of the brake arm is released, a rotary force in an opposite direction is transmitted to the brake arm and the rotary body 6 by the return spring. However, since the rotary body 6 rotates in a direction wherein the diameter of the lock spring 22 shrinks and that of the clutch spring 27 enlarges, the lock spring 22 clamps the rotary body 6 and the supporting shaft 3 and the clutch spring 27 clamps the rotary body 6 and the damper case 7. By this, since the rotation of the rotary body 6 is restricted, the rotation of the brake arm is also locked, whereby the parking brake (not shown) connected to the brake arm with a cable for remote control (not shown) becomes a lock state.

The lock releasing of the parking brake in this state is performed by the rotary operation of the lock releasing ring 23 in a lock releasing direction. Namely, to the lock releasing ring 23 is latched the hook portion 22b of another end of the lock spring 22, and the rotary direction thereof is a winding direction of the lock spring 22. Accordingly, the diameter of the lock spring 22 enlarges whereby the clamps to the rotary body 6 is released. Accordingly, the brake arm rotates in the opposite direction against the direction at the time of treading by the return spring and returns to the original position. At this time, since the diameter of the clutch spring 27 enlarges, the rotary body 6 and the damper case 7 rotates integrally and the shearing stress acts to the viscous material filled between the damper case 7 and the cylindrical portion 3b of the supporting shaft 3 and then the brake arm returns to the original position with a slow speed because the rotary force is absored to the viscosity resistance of the viscous material to same extent.

Figure 2:
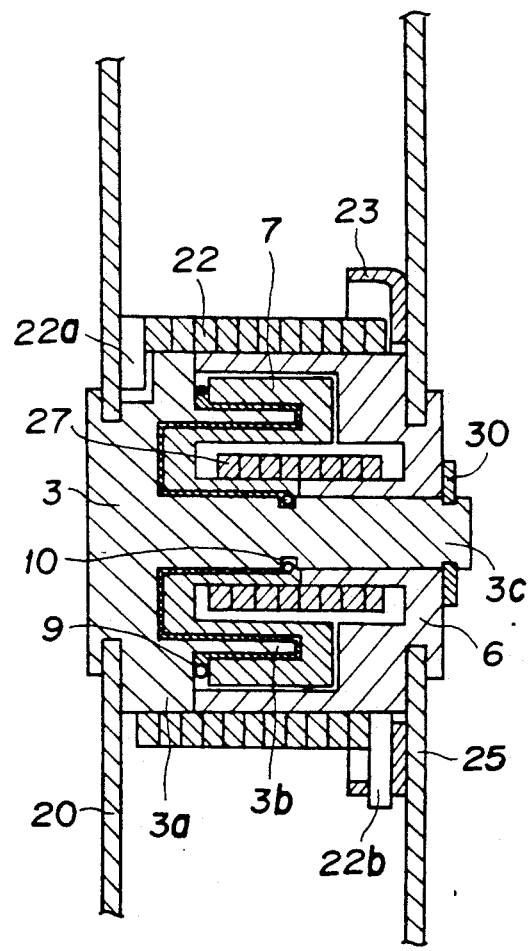
FIG. 2 is a cross-sectional view of another embodiment.
Figure 3:
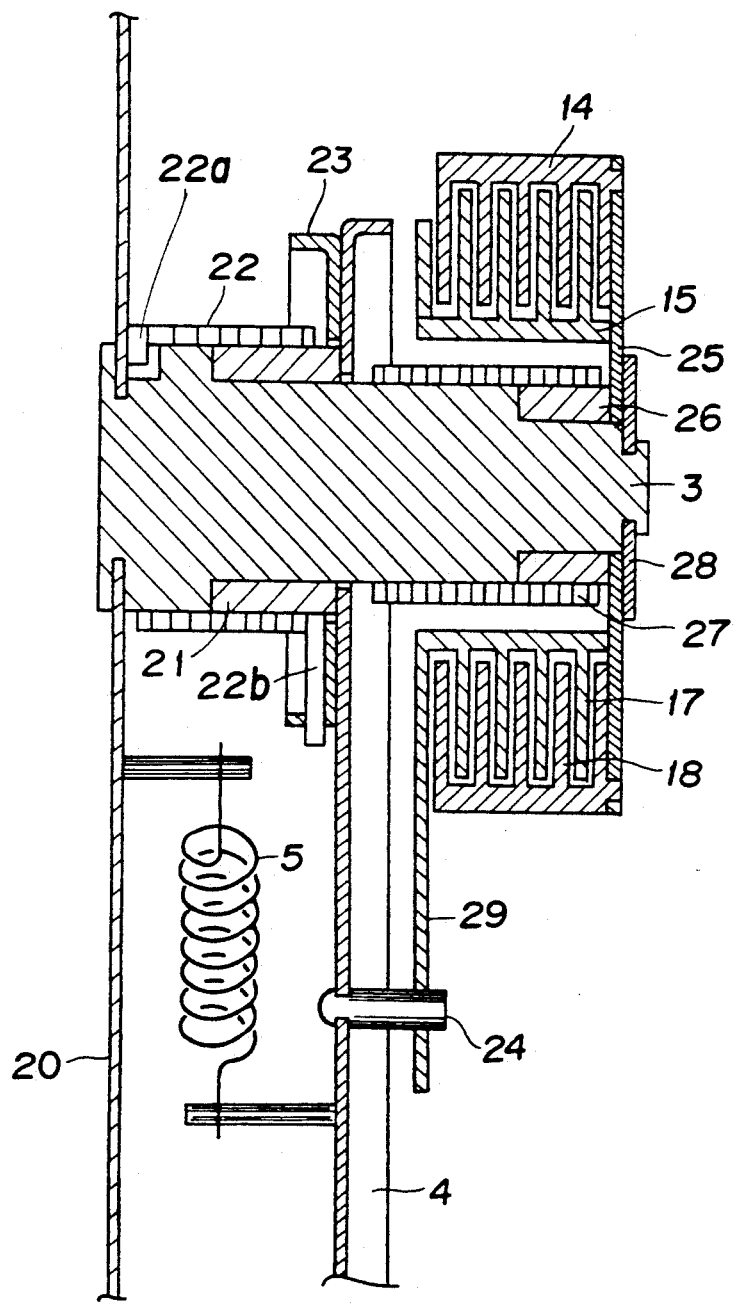
FIG. 3 is a cross-sectional view of a conventional device.

In such embodiment of this invention, the construction of the lock spring 22 and the clutch spring 27 are doubly provided outwardly and innerly without being arranged in parallel with respect to the supporting shaft 3 with at least portions of the clutch spring, damper case and lock spring being in axial alignment on the supporting shaft as clearly shown in both FIGS. 1 and 2. Accordingly, it is possible to make the device compact.

Embodiment 2

FIG. 2 is another embodiment according to this invention. The same construction elements as the embodiment of FIG. 1 are shown with the same numerals respectively and overlap descriptions are omitted.

This embodiment is different from the embodiment 1 in points that the rotary body 6 is a double cylindrical form and the damper case 7 is a triple cylindrical form, both being slidably contacted with the small portion 3a of the supporting shaft 3. The clutch spring 27 provided innerly in a closely contact state to the rotary body 6 and the damper case 7, enlarges its diameter according to the rotation of the rotary body 6 when the brake arm is treaded. However, when the treading of the brake arm is released, the rotary body 6 rotates in the opposite direction whereby the clutch spring 27 is adapted to shrink its diameter. Other actions are the same as that of the embodiment in FIG. 1. However, in this embodiment, the filled portions of the viscous material spread not only to the clearance between the cylindrical portion 3b of the supporting shaft 3 and the damper case 7, but also to the clearance between the damper case 7 and the small diameter portion 3c of the supporting shaft 3. Accordingly, the viscosity resistance of the viscous material which acts at the time of the return rotation of the brake arm becomes larger, whereby the brake arm returns to the original position with more slow speed than that of the embodiment in FIG. 1.

According to this invention as described above, the lock spring is provided outwardly to the supporting shaft and the rotary body in a closely contact state and the clutch spring is provided innerly to the rotary body and the damper case in a closely contacted state whereby both springs are constructed to attach them doubly to the supporting shaft outwardly and innerly. Accordingly, it is possible to plan the compaction of the device.

What is claimed is:

1. A pedal parking brake for a vehicle comprising a support shaft, means for fixing the support shaft to a vehicle body, the support shaft having a large diameter portion, a small diameter portion extending from the large diameter portion and a cylindrical member extending from the large diameter portion over a part of the small diameter portion, a revolving member mounted on the small diameter portion of the support shaft adjacent the cylindrical member for attachment to a brake arm, a damper case filled with viscous fluid embracing the cylindrical member, and external coiled locking spring wound over adjacent outer surfaces of the large diameter portion of the support shaft and the revolving member for locking the support shaft to the revolving member by radial contraction of the locking spring when a rotary braking force on the revolving member is released and for unlocking the support shaft and revolving member by radial expansion of the locking spring when the rotary braking force is applied, the locking spring having one end connected to the support shaft and an opposite end connected to a brake release member, and an internal coiled clutch spring positioned around the small diameter portion of the support shaft for engagement with adjacent surfaces of the damper case and the revolving member to clamp the revolving member to the damper case when the braking force is released, wherein at least portions of the clutch spring, the damper case and the locking spring are in axial alignment on the support shaft.

2. A brake as claimed in claim 1, wherein the clutch spring is positioned radially inwardly with respect to the adjacent surfaces of the damper case and the revolving member for clamping the damper case to the revolving member by radial expansion of the clutch spring.

3. A brake as claimed in claim 1, wherein the clutch spring is positioned radially outwardly with respect to the adjacent surfaces of the damper case and the revolving member for clamping the damper case to the revolving member by radial contraction of the clutch spring.

* * * * *